UNITED STATES PATENT OFFICE.

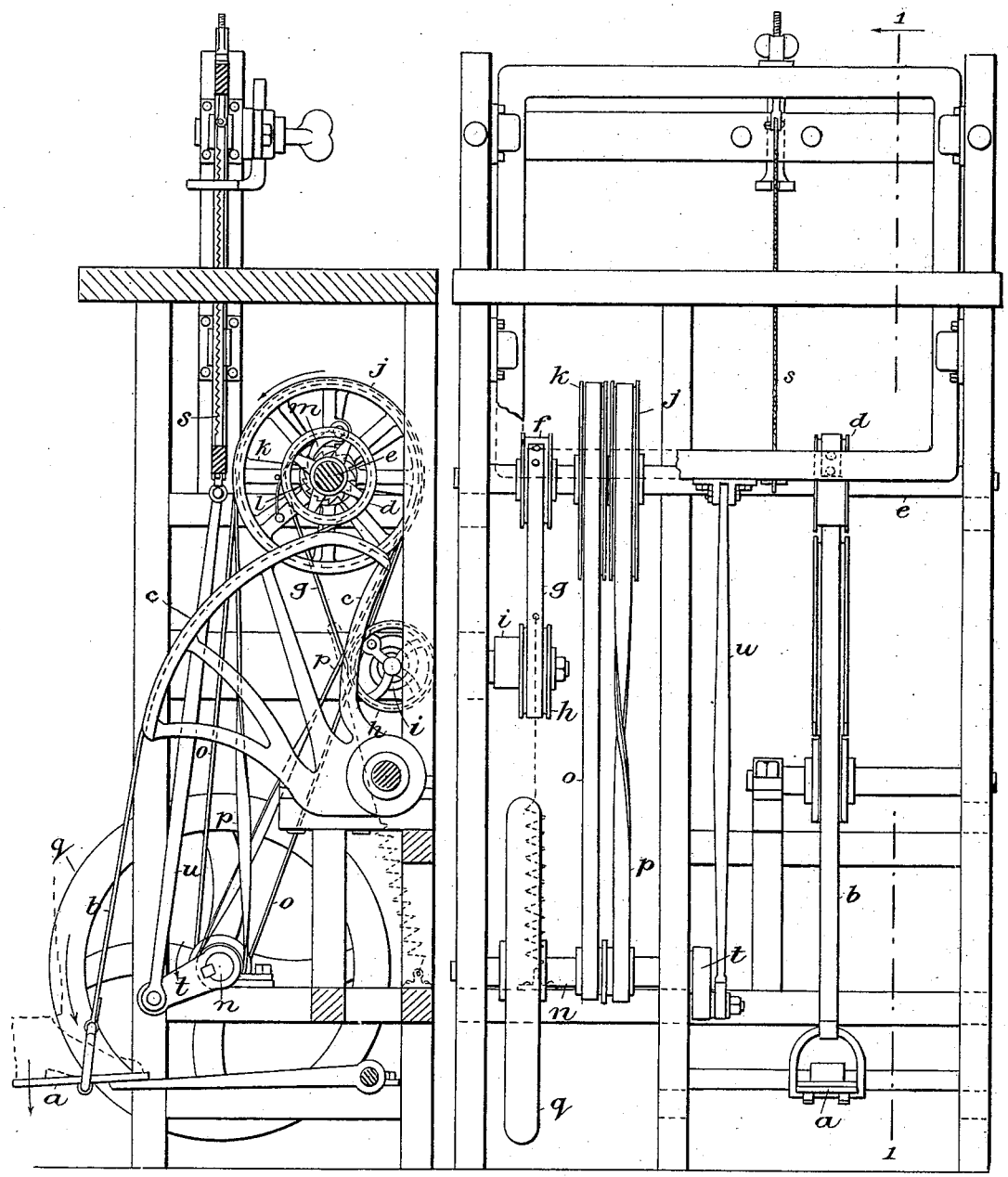

WILLIAM H. DOUGHTY, OF BROOKLYN, NEW YORK, ASSIGNOR OF ONE-HALF TO WM. NAGLE, OF SAME PLACE.

TREADLE-MOTION.

SPECIFICATION forming part of Letters Patent No. 407,472, dated July 23, 1889.

Application filed February 8, 1889. Serial No. 299,123. (No model.)

*To all whom it may concern:*

Be it known that I, WILLIAM H. DOUGHTY, a citizen of the United States, residing at Brooklyn, in the county of Kings and State of New York, have invented certain new and useful Improvements in Treadle-Motions; and I do hereby declare the following to be a full, clear, and exact description of the invention, such as will enable others skilled in the art to which it appertains to make and use the same.

My invention consists of a contrivance of mechanism intermediary of the treadle and a counter-shaft from which the power is applied, whereby the intermittent driving-power of the treadle is distributed, so as to act continuously on the counter-shaft and drive a jig-saw or other reciprocating device alike in both directions, and so as to operate the machine more uniformly and increase the effective application of the power, all as hereinafter fully described, reference being made to the accompanying drawings, in which—

Figure 1 is a sectional elevation on line 1 1 of Fig. 1; and Fig. 2 is a front elevation of a jig-sawing machine in which my improved treadle-motion is represented.

The treadle $a$ is connected by the strap $b$, passing over the segmental rock-pulley $c$, with the pulley $d$ keyed fast to the forwardly and and backwardly rotating shaft $e$, connected by pulley $f$ and strap $g$ with the spring-drum $h$, in which is a coiled spring $i$, so arranged that it is wound up when the treadle is forced down and the shaft $e$ is turned in the forward direction thereby, and when the power is relaxed on the treadle the spring reverses the motion of the shaft $e$ and raises the treadle again, so that said shaft is subject to the direct effect of the treadle in one direction, and is indirectly impelled in the other direction through the action of the spring.

On the shaft $e$ are two driving-pulleys $j$ and $k$, alternately driving in opposite directions through the ratchets $l$ and pawls $m$, respectively connecting them with said shaft reversely. Pulley $k$ is connected with the counter-shaft $n$ by a direct belt $o$, and pulley $j$ is connected by a cross-belt $p$, so that whichever way the shaft $e$ turns there is a continuous and uniform application of the power to this counter-shaft in one direction, and there is a fly-wheel $q$ on said shaft, which, being geared up to a rapid speed, enables the machine to work with greater uniformity and precision, particularly when, as in this example, the power is to be applied to a reciprocating device, as a jig-saw $s$, through a crank $t$ and a connecting-rod $u$. The rocker-segment $c$ carries the belt $b$ from the pulley $d$ to the treadle in a direction favoring the more effective action of the treadle than if the angle of the belt and treadle were more acute. The rocker may, however, be dispensed with and the belt $b$ extended directly from the pulley to the treadle.

Instead of locating the spring $i$ in a spring-drum $h$, mounted separately from the shaft $e$, the spring may be coiled around and connected directly to the shaft, and instead of using a flat coiled spring I may use a spiral spring, one end being connected to any support and the other connected to the pulley on the shaft by a belt, as $g$. This is indicated by the dotted lines in both figures of the drawings.

The device is also useful for driving rotary machines, as lathes, circular saws, and the like.

I claim as my invention—

1. The combination, with the treadle and counter-shaft, of the forward-and-backward rotatable shaft connected to said treadle by the band $b$, and the pulley $d$, keyed fast on said shaft, the pulleys $j$ and $k$ on said shaft alternately driving in opposite directions through the ratchets and pawls respectively connecting them with said shaft reversely, said pulleys connected with the counter-shaft, the one by a direct and the other by a crossed belt, and the spring connected with shaft $e$ and opposing thereon the action of the treadle, substantially as described.

2. The combination of the rocker-segment $c$ with the treadle $a$, band $b$, pulley $d$, reversely-rotatable shaft $e$, the oppositely-driving pulleys $j$ $k$, and the spring impelling said shaft reversely to the action of the treadle, substantially as described.

In testimony whereof I affix my signature in presence of two witnesses.

WM. H. DOUGHTY.

Witnesses:
W. J. MORGAN,
W. B. EARLL.